UNITED STATES PATENT OFFICE.

RANDALL T. VAN VALKENBURG, OF MUSKEGON, MICHIGAN, ASSIGNOR TO THE MUSKEGON CHEMICAL FIRE ENGINE COMPANY, OF SAME PLACE.

FIRE-EXTINGUISHING COMPOUND.

SPECIFICATION forming part of Letters Patent No. 432,777, dated July 22, 1890.

Application filed March 1, 1890. Serial No. 342,291. (No specimens.)

*To all whom it may concern:*

Be it known that I, RANDALL T. VAN VALKENBURG, a citizen of the United States, residing at Muskegon, in the county of Muskegon and State of Michigan, have invented certain new and useful Improvements in Fire-Extinguishing Compounds, of which the following is a specification.

This invention relates to new and useful improvements in generating gases for fire-extinguishers or chemical engines, in which the expansive force of a gas produced by the chemical reaction of a carbonate acid is used to expel a fire-extinguishing compound or water mixed with said gas and the material from which it is produced.

In practice it has been found that carbonic-acid gas as the impelling force has two decided disadvantages. The first is that when generated, as in the usual manner, by the chemical reaction of a strong acid upon bicarbonate of soda the generation is so sudden that a large portion of the solution of carbonate is expelled before the acid is fully neutralized, thus leaving behind a large portion of free acid, which often creates considerable damage when thrown upon articles of merchandise, furniture, &c. The second disadvantage is that the comparative great weight of the carbonic-acid gas compared with air makes it ineffectual as a fire-extinguishing agent, such as extinguishing fires in elevators, stairways, chimneys, &c.

The object of my invention is to overcome these objections by substituting sulphurous-acid gas, in a measure, for the carbonic-acid gas, and by generating the gases in a manner which provides for a more constant and continued pressure.

My invention consists in generating sulphurous-acid gas with carbonic-acid gas in the following manner:

Any of the well-known forms of extinguishers may be used in carrying out my invention.

By placing in the separate chamber provided in the main receptacle, in which the water or other extinguishing compound is contained, separate bottles containing hydric sulphate and sodium sulphite, respectively, in such close relation to each other that when the contents of these bottles is allowed to escape by breaking the bottles or otherwise they will be brought into immediate contact, and thereby produce a chemical reaction which generates a large volume of sulphurous-acid gas, which of itself is capable of expelling the fire-extinguishing compound or water from the extinguisher; but, preferably, I use a suitable carbonate—such as bicarbonate of soda in solution in the main vessel—either alone or mixed with any of the usual chemicals, such as ammonia, chloride, and sodium chloride. That portion of the hydric sulphate which has not acted upon the sodium sulphate will, upon being precipitated into the solution of the main vessel, generate a large volume of carbonic-acid gas, which mixes with the sulphurous-acid gas already generated or still generating, and in proportion as pressure increases the sulphurous-acid gas, being the most soluble and condensable, will be condensed and absorbed in the solution. As soon as the force of the carbonic-acid gas decreases, the pressure will be maintained by the expansive force of the sulphurous-acid gas in the solution. The sudden generation of the carbonic-acid gas is also materially modified by the chemical mixing of the hydric sulphate and the simultaneous generation of sulphurous-acid gas. The material expelled from the extinguisher by the combined force of these gases when directed upon the flame will carry the sulphurous-acid gas in a condensed form into the flame, where it may immediately resume its gaseous form, and contrary to the action of the carbonic-acid gas will envelop the flame instead of falling away, as the carbonic-acid gas will do if occasion is offered. Thus, taking all the various contingencies for which fire-extinguishers are provided in houses, &c., into consideration, a fire-extinguishing compound, in which both kinds of gases are generated, will be preferable to one in which carbonic-acid gas alone is used.

The sulphite of soda, and especially the chemical action of the sulphurous oxide, forms itself an excellent fire-extinguishing material by its tendency to absorb oxygen from the atmosphere.

What I claim as my invention is—

The herein-described improvement in the method of generating gas in fire-extinguishers, consisting in first mixing hydric sulphate with a solution of sulphite of soda or other sulphite and then throwing the mixture into a solution of a carbonate contained in the main vessel of the extinguisher, substantially as described.

In testimony whereof I affix my signature, in presence of two witnesses, this 6th day of January, 1890.

RANDALL T. VAN VALKENBURG.

Witnesses:
 M. B. O'DOGHERTY,
 ALFRED B. EATON.